United States Patent
De Cnodder et al.

(10) Patent No.: US 7,593,397 B2
(45) Date of Patent: Sep. 22, 2009

(54) METHOD FOR SECURING COMMUNICATION IN A LOCAL AREA NETWORK SWITCH

(75) Inventors: Stefaan Jozef De Cnodder, Lille (BE); Patrick Paul Yvonne Mensch, Edegem (BE)

(73) Assignee: Alcatel, Paris (FR)

( * ) Notice: Subject to any disclaimer, the term of this patent is extended or adjusted under 35 U.S.C. 154(b) by 628 days.

(21) Appl. No.: 11/177,313

(22) Filed: Jul. 11, 2005

(65) Prior Publication Data

US 2006/0013221 A1 Jan. 19, 2006

(30) Foreign Application Priority Data

Jul. 16, 2004 (EP) .................................. 04291831

(51) Int. Cl.
*H04L 12/28* (2006.01)
(52) U.S. Cl. ....................................... 370/389; 370/392
(58) Field of Classification Search ........................ None
See application file for complete search history.

(56) References Cited

U.S. PATENT DOCUMENTS

| | | | |
|---|---|---|---|
| 5,654,985 A * | 8/1997 | Crayford et al. ............ 375/211 |
| 6,493,340 B1 * | 12/2002 | Kawanaka .................. 370/392 |
| 7,379,423 B1 * | 5/2008 | Caves et al. ................. 370/232 |
| 2002/0010869 A1 | 1/2002 | Kim | |
| 2003/0105881 A1 | 6/2003 | Symons et al. | |
| 2003/0161310 A1 * | 8/2003 | Dobbins et al. ............ 370/392 |
| 2003/0208571 A1 | 11/2003 | Lin et al. | |
| 2003/0236685 A1 * | 12/2003 | Buckner et al. ................. 705/4 |

* cited by examiner

*Primary Examiner*—Duc C Ho
(74) *Attorney, Agent, or Firm*—Sughrue Mion, PLLC

(57) ABSTRACT

Method for securing communication in a local area network switch (AN) comprising a user interface (UI) and a network interface (NI), comprises the steps of extracting a source address (MACi) from each packet received by said Local area network switch (AN) and storing said address (MACi) together with associated information into a address forwarding table (FT) comprised in said Local area network switch (AN) is characterised in that a distinction is made between source addresses received from the user interface (UI) and the network interface (NI), such that upon detecting that a source address (MACi) contained within a newly received packet at the user interface (UI) was already stored as a source address received at the network interface (NI), said newly received packet will be discarded and its source address contained therein will not be stored within said address forwarding table (FT).

6 Claims, 2 Drawing Sheets

METHOD FOR SECURING COMMUNICATION IN A LOCAL AREA NETWORK SWITCH

The present invention relates to a method for securing communication in local area network switches.

BACKGROUND OF THE INVENTION

Extracting source addresses from incoming packets and storing them together with associated information within an address forwarding table is a widespread technique, well known as self-learning in local area network networks. The most widespread standard for local area networks is the Ethernet standard, wherein the source addresses are denoted as MAC addresses. The self-learning technique allows for easy forwarding of data packets through and by local area network switches, without the need to store significant routing tables. Indeed, upon arrival of a new packet, the source address as well as related associated information as the link via which the packet is received and the internal switch port on which the packet was received will be stored in a so-called address forwarding table. Ethernet switches having at least two interfaces comprising at least a user interface an a network interface exist today, and can be found in access networks such as DSL access networks, passive optical access networks, cable access networks etc. In these particular local area network switches a user interface serves to receive and transmit packets from and to end-users via a local area home network, and at the other side, a network interface, serves to receive and transmit packets from and to servers and routers via for instance an Ethernet metropolitan local area network. Also in these Local area network switches having a user and a network interface, self-learning is a common practice. Thus also in these local area network switches, each time a new packet arrives, from either interface, the source address information is extracted and added, to the forwarding table. In case the source address was already present in this table, its associated information will be overwritten with the new associated information.

Such classical self-learning Ethernet switches are however prone to address spoofing, with which term is meant that one user "steals" the address of another user or server, and uses this as its own address by putting it as a source address in packets sent by him. The Ethernet switch will then add this information or overwrite the already present correct information with that of the malicious user, causing other users and the Ethernet switch itself, a lot of trouble.

A method for securing communication trying to overcome these problems of malicious use in Ethernet switches is disclosed in the published U.S. patent application 2002/0010869. This prior art document describes a MAC address-based communication restricting method, wherein it is determined whether access vectors of a received MAC address are present in an address entry table. If present, a comparison takes place between security keys stored under the form of access vectors, between these of the MAC destination and the source address. If these to not match, access is denied.

This prior art method therefore requires these security keys to be first configured and stored within a so-called "Hacker table". This table is to be pre-configured to store the security keys. However this method is rather complex and requires the intervention of an operator who has to build up this Hacker table.

SUMMARY OF THE INVENTION

An object of the present invention is to provide a simpler method for securing communication in an Local area network switch which is more simple and which does not rely upon the buildup of such a anti-hacker table.

According to the invention, this object is achieved due to the fact that a distinction is made between source addresses received from a user interface (UI) and a network interface (NI), such that upon detecting that a source address (MACi) contained within a newly received packet at the user interface (UI) was already stored as a source address received at the network interface (NI), the newly received packet will be discarded and its source address contained therein will not be stored within the address forwarding table (FT).

In this way, a simple method for avoiding spoofing of source addresses of a router or server, by a user, is presented without the need of a anti-hacker table. Instead a distinction is made between source addresses received at the user interface, and those received at the network interface. This distinction can be under the form of a special tag which is additionally stored in the (single) address forwarding table, or the address forwarding table itself may be split up into 2 separate tables: one for the user interface and one for the network interface. In addition a direct comparison of the source addresses of the servers or routers, learned on the network side, and these retrieved from packets received at the user interface takes place. When the Local area network switch then extracts a source address on the user side, which same source address was already learned on the network side, the source address learned on the network side will always take precedence. More specifically this means that, if the source address is first learned on the network side, and later this same source address is also extracted on the user side, then the address forwarding table is not modified and the newly received packet from the user is discarded. A malicious user thus wanting to spoof a source address from the server such that all traffic intended for this server would not arrive at this server but at this client if just standard learning techniques are present in the switch, will now not succeed in obtaining its aim. By virtue of the self-learning procedure, if a newly received packet from the network side includes a source address already contained in the forwarding table, the new source address and its associated information will be stored in the forwarding table, by the standard self-learning process, thus also overriding previously stored (wrong) MAC source addresses originating from a malicious user.

This means that only a small adaptation, consisting of a determination of the interface on which the packet is received, and a small check, in case the packet is received from the user interface, is to be added to the widespread self-learning mechanism into the existing Local area network switches. Thus the subject method is very simple and easily implementable in existing standard Ethernet switches.

A further characteristic feature of the present invention detects that a new received network address was already stored as a user address in an address forwarding table (FT), where the entry in the address forwarding table is related to a user address and will be stored in an additional table after which entry will be overwritten by the newly received address and its associated information.

In this way a list of malicious users can then be automatically formed by automatic storage of information related to these malicious users in the additional table.

This list of malicious users can as well be updated in case a source address is learned from the network side, which was already present in the address forwarding table. This means that also in this case a malicious user was active, which was yet unknown to the switch, until the same (router) source address appears at the network side. In this case the old user information is normally overwritten by the information from the network side, which action now secures the communication within the switch, but it can be useful to keep track of such malicious users and, before overwriting their information present in the address forwarding table, it could thus first be entered into the additional table.

The present invention relates as well to an Local area network switch which is adapted for performing the subject method.

It is to be noticed that the term 'coupled', used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

The above and other objects and features of the invention will become more apparent and the invention itself will be best understood by referring to the following description of an embodiment taken in conjunction with the accompanying drawings wherein

BRIEF DESCRIPTION OF THE DRAWINGS

FIG. 1 shows a schematic overview of a local area network comprising a Local area network switch AN having a user and a network interface and coupled to user terminals T1 to Tn and routers R1 to Rr, FIG. 2. schematically shows the different steps taking place upon arrival of new packets to either interface in the Local area network switch AN.

DETAILED DESCRIPTION OF EXEMPLARY EMBODIMENTS OF THE INVENTION

The present invention is of interest in Ethernet aggregation networks where all users share the same Local Area Network, hereafter abbreviated with LAN, but it not limitative to these local area networks using this Ethernet standard. In such LAN networks each user is allocated a unique address, generally known as MAC address for Ethernet LAN networks. Local area network switches perform forwarding of received packets based on the source and destination addresses contained therein. For this purpose each local area network switch has to "learn" the source addresses with which is meant that an address forwarding table is completed with information related to the address such as the internal port name of the port of the Ethernet switch which is linked to the client or user with this specific address, information related to the link itself, as is well known by a person skilled in the art.

The present invention is applicable to these types of local area network switches having at least two interfaces: at one side a user interface, at the other side a network interface. Local area network switches having the latter two interfaces can for instance consist of DSL access nodes, a modem in a DSL network coupled to several computers at the user's side, concentrators or even wireless access nodes. Such a local area network switch, as the one depicted in FIG. 1 by AN, is coupled, at its user's side, via its user interface, UI, to several user lines, for instance DSL lines in a DSL access network. These user lines may as well consist of several coax cables in case of a concentrator constituting the local area network switch, or of wireless links in case of a wireless access node as local area network switch. These user lines are depicted 1 to n in FIG. 1. Each of these user lines is coupled at the user's premises side to a user terminal or device, denoted T1 to Tn. Such a termination device can consist of a simple personal computer, a voice-over-IP phone, a set-top box etc. Some user terminals, such as a DSL modem, can in their turn be further connected to several devices at a user's premise such as one or more personal computers, possibly internally coupled by internal routers. Each of these termination devices or user devices has its own local area network address. The invention is as well applicable to the Local area network switches coupled to the several modems in case they have a separate Local area network source address, as to the modems themselves in case they are in their turn coupled to several devices such as computers.

Figure 1:
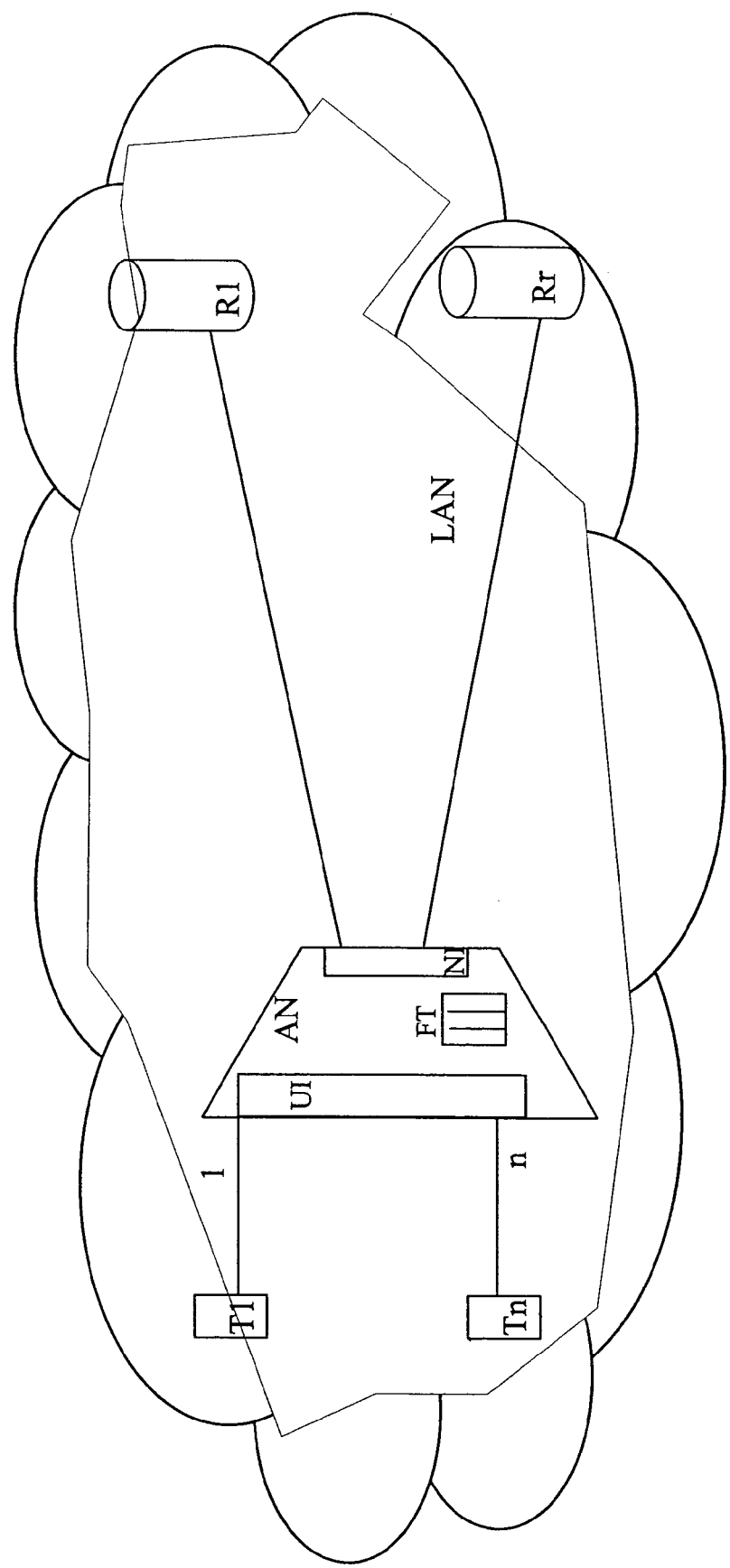
FIG. 1 is an illustration of an interactive digital television broadcasting system.

On the other side, being the right-hand side of AN as schematically depicted in FIG. 1, the Local area network access node AN is coupled via its network interface NI to one or more routers or servers, denoted R1 to Rr contained therein. Each of these routers is also having its own local area network (MAC) address.

As previously explained, forwarding a packet from one terminal or router such as T1 or R1 coupled to AN to another one at the other side of AN is based upon learning the addresses of the different user terminals and routers, with which process is meant that an address forwarding table, in FIG. 1 denoted by FT is filled with entries, containing the source (MAC) addresses received in new arriving packets, as well as further information associated with it such as their corresponding incoming port identity. So when a DSL Local area network access node receives a packet coming from a particular DSL line, for instance line 1, and including MAC1 as source address, then the access node stores this information such as MAC1, and the internal port name connected to DSL line 1, within this forwarding table. If then next a packet is received from router R1, with MAC1 as destination address, AN can immediately, upon retrieving the necessary information within the forwarding table, forward this packet unto DSL line 1.

Alternatively, AN learns also the source address MACR1 from the router R1, and stores this information together with the internal port connected to R1, within the address forwarding table FT.

Malicious clients at the user's side of the access node, sometimes want to use the address of the router or server at the network side as their own source address. This is called MAC address spoofing, which is thus the use of a MAC address by a particular subscriber, that does not belong to that subscriber. The result is that, upon spoofing a MAC address by a user, this user thus generates upstream data packets with a MAC source address belonging to someone else. Accordingly, the address forwarding table in the access node learns the wrong associations. If then other users want to send packets towards the router whose MAC address is spoofed, for instance by user 1, all packets could be sent to user 1. In some existing Ethernet switches this is already avoided by blocking direct user-to-user transmission, but in other Ethernet switches serious problems could result. And even if direct user-to-user transmission is not possible, users spoofing a source address of a router will cause that this router will no longer receive any packet.

The present invention provides a simple solution to avoid spoofing of addresses of routers thus at the network side, by a user at the user's side. This solution consists in, each time a new source address is received, either at the user side, either at the network's side, it is determined from which interface it is received. Next a comparison is performed between the new received source address at the user's side and all stored source addresses received at the network side. If it turns out that the source address was already stored as a source address from the network side, the packet containing the new source address is discarded. If a new source address of the network side matches with one already stored at the user's side, the existing entry with this address will be overwritten by the standard learning with an extra indication that it consists of a source address received from the user's side. If a new source address at the user's side is not yet contained in the address forwarding table, it will be stored together with the classical associated information and with an indication that it originates from the user side in the forwarding table. To this purpose a special flag can be stored in FT, but FT may as well be split up into two parts : a user-originated part and a network originated part, and other techniques for making and storing this distinction can be envisaged by a person skilled in the art.

If a new router source address is not yet stored in FT, it will be as well be stored with its additional associated information and together with an indication of its origin, user or network side, in FT, or in the network's part of FT, depending on the implementation of this table.

Figure 2:
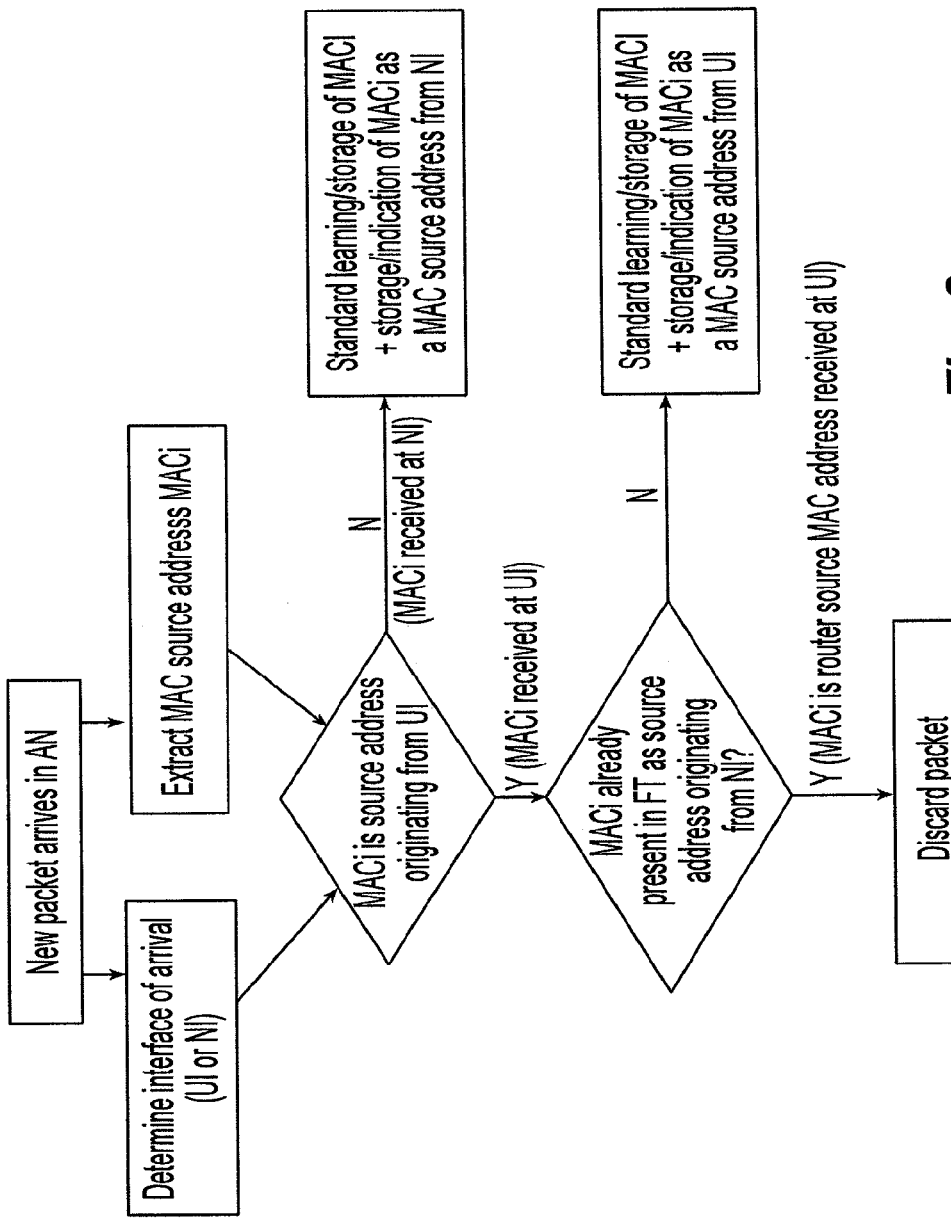

This is schematically depicted in FIG. 2. In addition to discarding a packet from a user having an already stored "network" source address, additional information related to this user can be further stored into an additional table. It is therefore also to be remarked, that, in addition to the standard self-learning as depicted in the two right-hand side boxes of FIG. 1, first an internal check within this additional table can be performed, and that, after the standard learning, an update of this additional table will be performed as well, for instance upon detecting that a new received network address was already stored as a user address in said address forwarding table. In that case the entry in the address forwarding table related to the (malicious) user address will be copied and stored in said additional table after which step the entry in the address forwarding table will be overwritten by the new received address and its associated information.

After the standard learning of course other steps concerning further handling of the received packets will take place as is well known by a person skilled in that art.

The execution of these steps can take place by processing means included in the local area network switch, or by several software modules. To this purpose a discrimination means, either present under the form of a software program, or specific hardware within the switch is adapted to make a distinction between source addresses received from said user interface and said network interface. Similarly a comparison means for comparing a source address contained within a new arriving packet at said user interface (UI) with all stored source addresses in said forwarding table (FT) which were received from said network interface (NI), such as to provide a control signal to a discarding means for discarding said new arriving packet in case the source address contained therein was already stored as a source address received from said network interface may as well be realised by means of software modules or in hardware.

Also a means for detecting that a new received network address was already stored as a user address in said address forwarding table (FT) and for sending the entry in the address forwarding table related to said user address to said additional table and to instruct said forwarding table to overwrite this entry by the new received address and its associated information may be realised by means of software programs or processing means in hardware.

Of course other implementations are possible. While the principles of the invention have been described above in connection with specific apparatus, it is to be clearly understood that this description is made only by way of example and not as a limitation on the scope of the invention, as defined in the appended claims.

The invention claimed is:

1. A method for securing communication in a local area network switch (AN) comprising a user interface (UI) and a network interface (NI), said method comprising the steps of extracting a MAC source address (MACi) from each packet received by said Local area network switch (AN) and storing said MACi source address together with associated information into a address forwarding table (FT) comprised in said Local area network switch (AN);
   wherein
   a distinction is made between MAC source addresses received from the user interface (UI) and the network interface (NI), such that upon detecting that said MACi address contained within a newly received packet at the user interface (UI) was already stored as a MAC source address received at the network interface (NI), said newly received packet will be discarded and its MAC source address contained therein will not be stored within said address forwarding table (FT).

2. The method according to claim 1, wherein further user information related to said discarded packet is stored within an additional table.

3. The method according to claim 2, wherein upon detecting that a new received network address was already stored as a user address in said address forwarding table (FT), the entry in the address forwarding table related to said user address will be stored in said additional table after which step said entry will be overwritten by the new received address and its associated information.

4. A Local area network switch (AN) including a user interface (UI) and a network interface (NI) and an address forwarding table (FT) for storing a MAC source addresses (MACi) extracted from each packet received by said local area network switch (AN) together with associated information related to said MACi source addresses,
   wherein said local area network switch (AN) is further adapted to make a distinction between MAC source addresses received from said user interface and said network interface, said local area network switch (AN) further compares a MAC source address contained within a new arriving packet at said user interface (UI) with all stored MAC source addresses in said forwarding table (FT) which were received from said network interface (NI), such as to provide a control signal for discarding said new arriving packet in case the source address contained therein was already stored as a MAC source address received from said network interface.

5. The Local area network switch (AN) according to claim 4 further including an additional table for storing further user information of the discarded packet.

6. The Local area network switch (AN) according to claim 4 further including means for detecting that a new received network address was already stored as a user address in said address forwarding table (FT) and for sending the entry in the address forwarding table related to said user address to said additional table and to instruct said forwarding table to overwrite this entry by the new received address and its associated information.

* * * * *

UNITED STATES PATENT AND TRADEMARK OFFICE
CERTIFICATE OF CORRECTION

PATENT NO. : 7,593,397 B2  Page 1 of 1
APPLICATION NO. : 11/177313
DATED : September 22, 2009
INVENTOR(S) : De Cnodder et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1066 days.

Signed and Sealed this

Twenty-first Day of September, 2010

David J. Kappos
*Director of the United States Patent and Trademark Office*